(No Model.)  3 Sheets—Sheet 1.
G. F. MOORE.
MACHINE FOR SHAPING HEEL STIFFENERS.

No. 299,996. Patented June 10, 1884.

Witnesses:
Walter E. Lombard.
Stephen Moore

Inventor:
George F. Moore,
by N. C. Lombard
Attorney.

(No Model.) 3 Sheets—Sheet 2.
G. F. MOORE.
MACHINE FOR SHAPING HEEL STIFFENERS.
No. 299,996. Patented June 10, 1884.
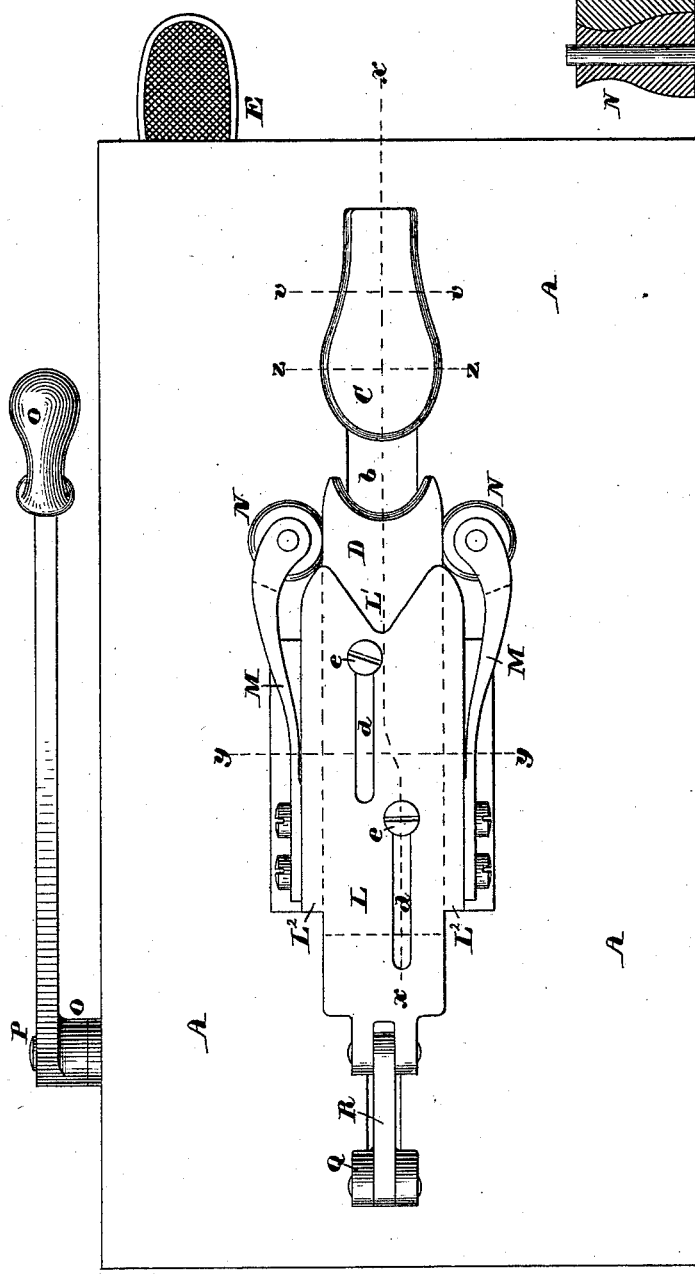
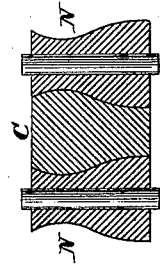
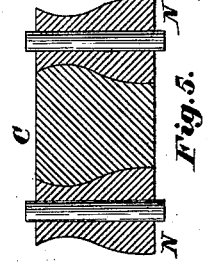
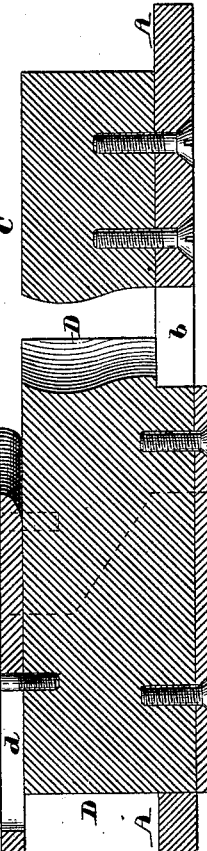
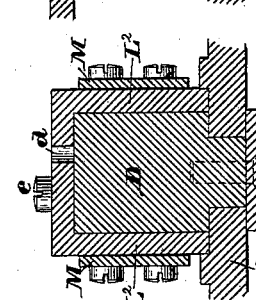
Witnesses:
Walter E. Lombard.
Stephen Moore
Inventor:
George F. Moore,
by N. C. Lombard
Attorney.

(No Model.)  3 Sheets—Sheet 3.

G. F. MOORE.
MACHINE FOR SHAPING HEEL STIFFENERS.

No. 299,996.  Patented June 10, 1884.

Witnesses:
Walter E. Lombard.
Stephen Moore

Inventor:
George F. Moore,
by N. C. Lombard
Attorney.

UNITED STATES PATENT OFFICE.

GEORGE F. MOORE, OF KENNEBUNK, MAINE.

MACHINE FOR SHAPING HEEL-STIFFENERS.

SPECIFICATION forming part of Letters Patent No. 299,996, dated June 10, 1884.

Application filed April 12, 1884. (No model.)

*To all whom it may concern:*

Be it known that I, GEORGE F. MOORE, of Kennebunk, in the county of York and State of Maine, have invented certain new and useful Improvements in Machines for Shaping Heel-Stiffeners, of which the following, taken in connection with the accompanying drawings, is a specification.

My invention relates to a machine for shaping heel-stiffeners, and is especially adapted to reshaping such stiffeners after they have been partially formed by a previous operation; and it consists in certain novel features of construction, arrangement, and combination of parts, which will readily be understood by reference to the description of the drawings and to the claims to be hereinafter given.

Figure 1:
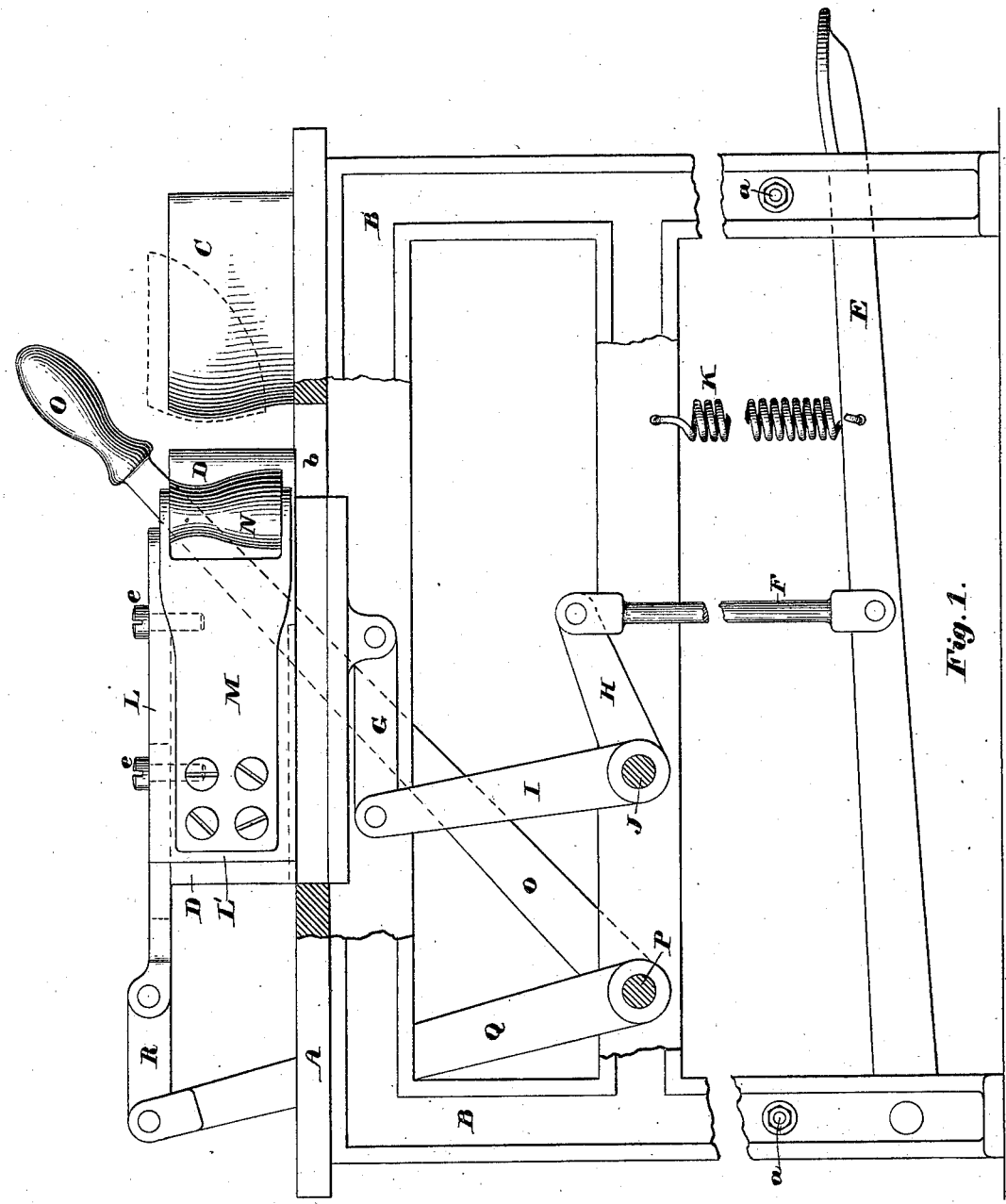
Figure 7:
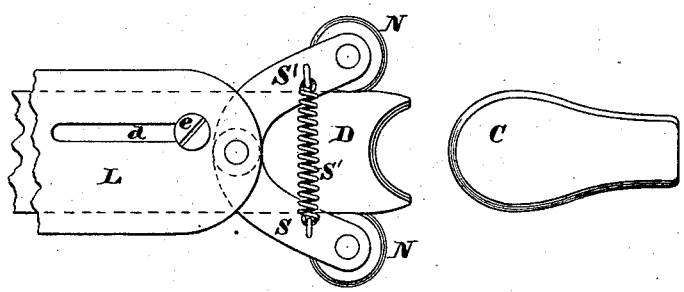
Figure 8:
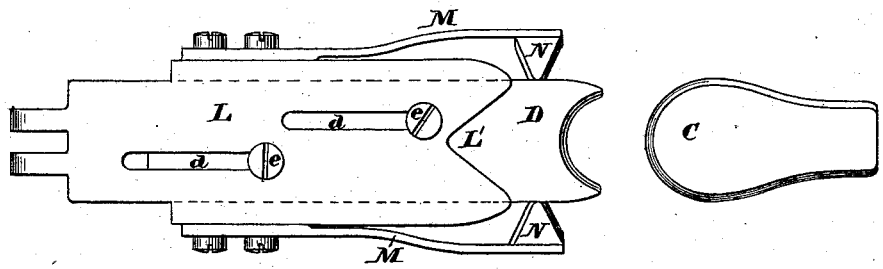
Figure 9:
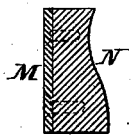

Figure 1 of the drawings is a side elevation of a machine embodying my invention, with a portion of the side frame broken away and a portion of the table cut in section. Fig. 2 is a plan of the same. Fig. 3 is a longitudinal section through the former, shaping-plunger, and flange-turner on line $x\ x$ on Fig. 2. Fig. 4 is a partial transverse section on line $y\ y$ on Figs. 1 and 3. Fig. 5 is a partial transverse section on line $z\ z$ on Fig. 2 when the side-shaping rolls have advanced to said line. Fig. 6 is a similar section on line $v\ v$ on Fig. 2. Fig. 7 is a partial plan illustrating a modification of the flange-turner. Fig. 8 is a partial plan of a modified form of the pressure-surfaces for shaping the sides of the stiffeners, and Fig. 9 is a sectional view of one of the pressure rubbing-surfaces shown in Fig. 8.

A is the table or bed of the machine, supported upon the side frames, B B, connected together by suitable tie-girts, as at $a\ a$ in Fig. 1.

C is a former shaped to correspond to the desired form to be given to the interior of the stiffeners, and secured in a fixed position upon the table A, its two sides having the same vertical curve at all points in its length forward of its point of greatest width, as shown.

D is a plunger fitted to a bearing in the slot $b$, formed in the table A, so as to be reciprocated therein, and having formed in its front end a mold or recess the counterpart of and adapted to inclose the rear portion of the former C as far forward as its point of greatest width. A reciprocating motion is imparted to said plunger by means of the treadle E, links F G, levers H and I, the rocker-shaft J, and the spring K, the forward motion being obtained by the operator placing his foot upon the treadle E and depressing it, and the rearward motion being caused by the reaction of the spring K when the operator removes his foot from the treadle.

L is a plate, which may be provided in its front end with a V-shaped notch, L', the under corner of which is rounded, as shown in Fig. 3; or it may have pivoted thereto the two curved arms S S, to act upon the portion of the stiffener which projects above the upper surface of the former C, as shown in dotted lines in Fig. 1, to turn it down upon the upper surface of said former, and thus form the flange of the stiffener. The plate L is made of a greater width than the plunger D, and has two downwardly-projecting plates, L², formed therewith or secured thereto, and fitted to embrace the plunger D, which forms a guide therefor, as shown in Fig. 4, to each of which plates is secured a leaf-spring, M, carrying a pressure rubbing-surface, N, curved longitudinally to conform to the vertical curve of the side of the former, and adapted to press and rub that portion of the blank which is forward of the plunger D when closed upon the blank and hold said blank against the former at or near the point where the flange-turner is acting upon the blank to turn the flange. The rubbing-surfaces may be in the form of rolls and mounted upon the spring M M, as shown in Figs. 1, 2, 3, 5, and 6; or they may be mounted upon the forward ends of the arms S S, which are drawn toward each other by the spring S', as shown in Fig. 7; or they may be rigidly secured to the springs M M or arms S S, as shown in Fig. 8. A reciprocating motion is imparted to the plate L and the rubbing-surfaces secured thereto by means of the hand-lever O, rocker-shaft P, lever Q, and link R, as shown in Fig. 1. The flange-turner L has formed therein the two slots $d\ d$, through which pass the headed studs $e\ e$, screwed into the plunger D, the heads of said studs serving to prevent the flange-turner lifting as it passes over the flange of the stiffener in an obvious manner.

The operation of my invention is as follows: The parts being in the positions shown in the drawings, the operator places the partially-formed stiffener in the position relative to the former C indicated by dotted lines in Fig. 1, holding it in the proper position, and then places his foot upon the treadle E and depresses it to move the plunger D forward and clamp the stiffener-blank between it and the former C. The forward movement of the plunger D causes an equal forward movement of the flange-turner and the side-shaping pressure-surfaces, so that they bear the same relation to said plunger after it has moved forward as they did before such advance. The operator now depresses the lever O to advance the side-shaping pressure-surfaces N N beyond the forward end of the plunger D, and over the side portions of the stiffener-blank, so as to roll and press said side portions and compel them to conform to the shape of the former, and also to move the flange-turner over the upper face of the former and turn the portion of the blank which projects above the upper surface of the former over thereupon and press it to set the flange. He then moves the lever O upward and backward and removes his foot from the treadle, when the parts again assume the positions shown in the drawings, and the completely-shaped stiffener may be removed from the former and another blank put in its place, when the operation may be repeated. The tension of the springs M M is such as to compel the pressure-surfaces to follow the curve of the former and press hard against the same at all points after they have passed in front of the forward end of the plunger D in an obvious manner.

In the machine illustrated in the drawings the former is stationary, and the mold, the flange-turner, and the pressure-surfaces are arranged to be reciprocated; but it is obvious that the mold may be stationary and the former and pressure-surfaces N N may be reciprocated, or the pressure-surfaces N N may be held stationary, so far as any movement in the direction of the length of the former is concerned, while the former and mold are both reciprocated, without affecting the principles of my invention, as it is only necessary that the parts shall have a reciprocating movement relative to each other and produce the results described.

I am aware that a pair of spring-pressed rotating rubbers arranged to rub the stiffener-blank from the center of the rear of the former forward and press it against the former, in combination with a flange-turner adapted to turn the flange of the stiffener and press it upon the former, have been used before; and I am also aware that a former has been used in combination with a mold made in three sections, one of which pressed the center portion of the blank around the rear end of the former, and the other two pressed the ends of the blank against the sides of the former without rubbing it; but neither of these arrangements will accomplish the same results as are produced by my invention.

A great advantage is obtained by the combination of the rear clamping-mold and the side-rubbing surfaces, inasmuch as the blank is held firmly to the former around its rear end while that portion of the flange is being turned, and the sides of the blank are much more effectually set to shape by the rubbing-surfaces than by a clamp acting thereon by direct pressure only. I do not therefore claim, broadly, either the spring-pressed rubbing-surfaces or the partially-encompassing mold; but

What I claim as new, and desire to secure by Letters Patent of the United States, is—

1. In combination with a heel-shaped former and a mold adapted to fit and inclose the rear portion of said former and clamp the blank thereto, said former and mold being arranged to be reciprocated toward and from each other, a device adapted to turn a flange upon the stiffener and press it hard upon the former, and a pair of pressure-surfaces curved longitudinally to fit the vertical curves of the sides of the former and adapted to be moved toward and from each other and the former, and to press and hold the blank to the former at or near the point where the flange-turner acts upon the blank to turn the flange, substantially as described.

2. In a machine for shaping heel-stiffeners, the combination of a heel-shaped former, a reciprocating plunger provided with a mold or recess in its front end to fit and inclose the rear portion of the former, a reciprocating flange-turner, and a pair of yielding pressure-surfaces curved longitudinally to conform to the vertical curves of the sides of the former, arranged to be moved with said flange-turner and adapted to press and hold the blank to the former at or near the point where the flange-turner acts upon the blank to turn the flange, substantially as and for the purposes described.

3. In a machine for shaping heel-stiffeners, the combination of the former C, the reciprocating plunger D, provided in its front end with a mold or recess to fit or inclose the rear portion of said former, the reciprocating plate L, provided with the V-shaped notch L', the springs M M, and the rolls N N, all arranged and adapted to operate substantially as described.

In testimony whereof I have signed my name to this specification, in the presence of two subscribing witnesses, on this 10th day of April, A. D. 1884.

GEORGE F. MOORE.

Witnesses:
WALTER E. LOMBARD,
STEPHEN MOORE.